(12) United States Patent
Yan et al.

(10) Patent No.: US 7,634,807 B2
(45) Date of Patent: Dec. 15, 2009

(54) SYSTEM AND METHOD TO ESTABLISH AND MAINTAIN CONDITIONAL TRUST BY STATING SIGNAL OF DISTRUST

(75) Inventors: Zheng Yan, Espoo (FI); Piotr Leon Cofta, Helsinki (FI)

(73) Assignee: Nokia Corporation, Espoo (FI)

( * ) Notice: Subject to any disclaimer, the term of this patent is extended or adjusted under 35 U.S.C. 154(b) by 865 days.

(21) Appl. No.: 10/637,813

(22) Filed: Aug. 8, 2003

(65) Prior Publication Data

US 2005/0033987 A1 Feb. 10, 2005

(51) Int. Cl.
*G08B 23/00* (2006.01)
(52) U.S. Cl. .............................. 726/22; 726/34; 713/169
(58) Field of Classification Search ......... 713/164–167, 713/168–170, 175, 179–181, 187, 189; 726/22–25, 726/26, 27, 34–36, 21; 705/64–67; 714/100, 714/25, 48, 799
See application file for complete search history.

(56) References Cited

U.S. PATENT DOCUMENTS

| | | | |
|---|---|---|---|
| 6,625,729 B1 * | 9/2003 | Angelo et al. .................. | 713/2 |
| 7,194,623 B1 * | 3/2007 | Proudler et al. .............. | 713/164 |
| 7,234,169 B2 * | 6/2007 | Ng et al. ........................ | 726/34 |
| 7,275,160 B2 * | 9/2007 | Pearson et al. ............... | 713/172 |
| 2002/0026576 A1 * | 2/2002 | Das-Purkayastha et al. . | 713/156 |
| 2003/0023872 A1 * | 1/2003 | Chen et al. ................... | 713/200 |

OTHER PUBLICATIONS

Trusted Computing Platform Alliance, "Main Specification Version 1.1b", Feb. 22, 2002, 332 pages.

* cited by examiner

*Primary Examiner*—Kimyen Vu
*Assistant Examiner*—Nirav Patel
(74) *Attorney, Agent, or Firm*—Hollingsworth & Funk, LLC

(57) ABSTRACT

A system and method is provided that establishes and maintains conditional trust by stating a signal of distrust from a trustee's computing platform to a trustor's computing platform. The trustor attests a trustee at a given time and also sends trust conditions to the trustee upon which the trustor trusts the trustee for some intended purpose. The trust conditions may include restrictions on hardware or software components and any status changes to the hardware or software components. The trustee then monitors the hardware and software components in relation to the trust conditions and reports distrust signals when the trustee's hardware and software configuration no longer matches the trust conditions.

29 Claims, 11 Drawing Sheets

SYSTEM AND METHOD TO ESTABLISH AND MAINTAIN CONDITIONAL TRUST BY STATING SIGNAL OF DISTRUST

FIELD OF THE INVENTION

This invention relates in general to trusted platforms, and more particularly, to trusted platforms capable of generating distrust signals when the trusted platform's current configuration state does not match a set of trusted conditions.

BACKGROUND OF THE INVENTION

Trust is a crucial aspect in e-commerce, communications, and related applications. Since e-commerce is implemented using both mobile and land based computing platforms, enhancing trust in these computing platforms is a fundamental issue and is of growing importance in the computing industry.

The Trusted Computing Platform Alliance (TCPA) formed in 1999 by Intel, HP/Compaq, IBM, Microsoft, and other companies, proposes a new computing platform for this century that will initially provide improved trust in the Personal Computer (PC) platform with eventual trust provided by the Trusted Mobile Computing Platform (TMCP). The TCPA promotes the concept of a trusted subsystem and chains of trust between such subsystems, so as to provide the basic building blocks for e-Commerce.

Originating from the TCPA, the Trusted Computing Group (TCG) focuses on open standards to enhance the overall security and trustworthiness of a variety of computing devices. One such standard is the Trusted Mobile Computing Platform (TMCP) that includes standards for trusted computing using mobile terminals. Ongoing efforts by the TCG continue to focus on the impact of TCPA on mobile commerce because the TCPA was initially intended for land based computing systems such as the PC.

The Trusted Platform (TP), as defined by the TCPA, is a platform that behaves the way it is expected to behave for its intended purpose. The TCPA definition of a trusted system is a system that always behaves in the expected manner for the intended purpose. The trust of a TCPA computing platform is built upon a root trust, which is convinced by sound existing technologies, including both hardware and software technologies. The root trust is realized through the TCPA subsystem, which typically consists of a root of trust for measuring integrity metrics; a Trusted Platform Module (TPM); and other Trusted Support Systems (TSS). The TCPA subsystem supports two roots of trust: the root of trust for measuring integrity metrics and the root of trust for storing and reporting integrity metrics, which is realized by the TPM.

The way in which a remote computing platform can be trusted is as follows. First, integrity metrics are queried from the platform, which are digitally signed by the trusted component of that platform. Second, the integrity metrics are compared with expected values that represent components that are trusted enough to perform the intended purpose. Third, if the compared values match the expected values, trusted interaction with the remote computing platform may be commenced. Anomalous metrics indicate that the platform is not operating as expected and further correspondence with the platform should be considered very carefully.

The TCPA strives to provide authenticity, integrity, and privacy so that: 1.) users are confident that they know to whom and to what entity they are communicating; 2.) transfer of information occurs accurately; and 3.) potential snoopers cannot invade the privacy of the system, message, or transaction. Trust, however, has several complicated and multi-dimensional concepts associated with it. Trust, for example, is dynamic because the level of trust that is considered sufficient varies for each individual and it varies over time. Trust is affected by many factors that are both subjective and objective, making a correct evaluation of trust difficult indeed.

Additionally, trust is not always transitive, meaning that: if entity A trusts entity B; and entity B trusts entity C; trust between entity A and C is not always conferred, although it may be in certain situations. Trust has varying degrees and scope, where entities typically develop trust for each other for their intended purpose, but that trust is not always transferred to other interactions between the entities.

Since trust is dynamic, it is impossible to provide a static/absolute trust solution. Accordingly, one disadvantage of the current TCPA paradigm, is that it does not provide a dynamic solution and is thus unable to tailor its protection for the changeable trust component. The static nature of the current TCPA solution, therefore, may cause a waste of resources and unnecessary attestation when the trust level is actually very high, while failing to satisfy security requirements for transactions when the trust level is actually very low.

Through checking of the integrity metrics, the root trust may trust the Basic Input Output System (BIOS), the BIOS may trust the Operating System (OS), the OS may trust the software application, and the software application may trust other remote systems. The chain of trust, however, does not necessarily remain intact for an extended length of time, nor does it remain in tact after hardware or software configuration changes. Accordingly, the trust chain is built up during system boot, which means that the OS can only verify its trust for previously identified configurations, thus failing to verify trust for any newly added hardware or software components.

Generally speaking, the TCPA fails to provide a model whereby integrity metrics may be trusted remotely. In particular, software applications may be able to record the challenge requests and their corresponding correct integrity metrics and thus may be able to replay the integrity metrics during subsequent integrity metrics requests. Once the recordings are complete, Denial of Service (DoS) attacks may also be implemented whereby TCPA compliant systems may be inundated with challenge requests and effectively crippled due to the sheer quantity of processing required by the challenge requests. One possible solution for these attacks is to time stamp the integrity metrics, however, a remote challenge procedure is easily simulated whereby signed integrity metrics may be obtained with a valid time stamp and subsequently replayed. Other solutions involve using serial numbers to identify the signed integrity metrics, the use of short-life cycle certificates or frequent polled metric checks, but each method is either non-economic, non-feasible, or provides limited attack protection.

Another area of deficiency within the trusted computing environment is exhibited by Java-2 Platform Micro Edition (J2ME) applications. Although certain security provisions are provided by the security and trust services Application Programming Interface (API) for J2ME, i.e., Java Specification Request (JSR) 177, it fails in many respects to provide adequately trusted operations.

In order to perform trusted operations, J2ME applications need to rely on the security services provided in a security element to ensure that, for example, the cryptographic keys are stored securely and that the cryptographic computations are performed securely. The proposed JSR 177 APIs establish a Java programming model for accessing the features of a security element, however, the trusted operation issue cannot be solved by JSR 177 because it simply focuses on MIDlet interaction with the security element, such as a smart card. The JSR 177 defines a collection of APIs that provide security services to J2ME enabled devices, i.e., it provides an access model that enables applications running on J2ME enabled devices to communicate with a smart card inserted in the device, but it fails to consider that the mobile code may be modified from its original state and may no longer be trusted. Digital signatures and Digital Rights Management (DRM) procedures are currently unable to solve the problem.

Accordingly, there is a need in the computing/communications industry for a system and method that implements trust based on the current TCPA/TCG technology while improving upon its propensity to counteract spoofing attacks and its ability to maintain trust.

Additionally, there is a need to provide a self-regulating mechanism that maintains trust without the need for unnecessary communication and computation.

SUMMARY OF THE INVENTION

To overcome limitations in the prior art, and to overcome other limitations that will become apparent upon reading and understanding the present specification, the present invention discloses a system and method for establishing and maintaining conditional trust between a trustee and a trustor by stating distrust signals from a trustee's terminal to a trustor's terminal.

In accordance with one embodiment of the invention, a method for establishing and maintaining conditional trust between a trustee and a trustor is provided. The method comprises generating metrics by a trustor that represents a trusted condition, comparing the generated metrics to current metrics of a trustee, and issuing a distrust signal by the trustee in response to a mismatch between the generated metrics of the trustor and the current metrics of the trustee.

In accordance with another embodiment of the invention, a trusted computing system is provided. The trusted computing system comprises a trustor terminal coupled to provide a trust condition to define a configuration state, and a trustee terminal coupled to receive the trust condition and coupled to provide attestation of the configuration state. The trustee terminal provides a distrust signal to the trustor terminal when the configuration state does not match the trusted condition.

In accordance with another embodiment of the invention, a mobile terminal wirelessly coupled to a network which includes a network element capable of providing a trusted condition is provided. The mobile terminal comprises a memory capable of storing at least a distrust signal module and a Trusted Platform Module (TPM) engine, a processor coupled to the memory and configured by the TPM engine to enable a configuration attestation with the network element, and a transceiver configured to facilitate a trusted condition exchange with the network element. The processor is configured by the distrust signal module to provide a distrust signal when the configuration does not match the trusted condition.

In accordance with another embodiment of the invention, a computer-readable medium having instructions stored thereon which are executable by a mobile terminal for maintaining a trusted system configuration is provided. The instructions perform steps comprising receiving trusted conditions representing a required system configuration of the mobile terminal, generating integrity metrics representative of a current system configuration of the mobile terminal, and supplying a distrust signal representative of a difference between the required system configuration and the current system configuration.

In accordance with another embodiment of the invention, a server within a network used to establish a trusted exchange with a mobile terminal is provided. The server comprises means for providing a trusted condition to define a configuration state of the mobile terminal, and means for receiving a distrust signal from the mobile terminal. The distrust signal is indicative of a difference between a current configuration state of the mobile terminal and the trusted condition.

In accordance with another embodiment of the invention, a computer-readable medium having instructions stored thereon which are executable by a server for facilitating trusted network computing is provided. The instructions perform steps comprising providing a trusted condition to define a configuration state of a trustee terminal, and receiving a distrust signal from the trustee terminal. The distrust signal is indicative of a difference between a current configuration state of the trustee terminal and the trusted condition.

In accordance with another embodiment of the invention, a distrust signal reporting system is provided. The distrust signal reporting system comprises a computing platform CAN configured to receive trust conditions from a trustor that defines a trusted configuration state, and an information monitor coupled to the computing platform CAN and configured to monitor configuration and status signals from a trustee platform and to report a configuration state of the trustee platform to the computing platform. The computing platform CAN generates a distrust signal when the configuration state of the trustee platform does not match the trusted configuration state.

In accordance with another embodiment of the invention, a trusted platform system is provided. The trusted platform system comprises a trustee computing platform configured to provide configuration and status signals relating to the trustee computing platform, a Root of Trust (ROT) measurement module coupled to the trustee computing platform and configured to measure integrity metrics associated with the trustee computing platform in response to the configuration and status signals, a ROT store module coupled to receive the integrity measurement metrics from the ROT measurement module, and a Trusted Platform Agent (TPA) coupled to receive trust conditions and challenges from a trustor and coupled to provide measurement data in response to the challenges. The trusted platform system further comprises a distrust signal reporting module. The distrust signal reporting module includes a computing platform CAN coupled to the TPA to receive the trust conditions, where the trust conditions define a trusted configuration state, and an information monitor coupled to the computing platform CAN and configured to monitor the configuration and status signals from the trustee computing platform and to report a configuration state of the trustee computing platform to the computing platform CAN. The computing platform CAN checks the trust conditions against the configuration state of the trustee computing platform and generates a distrust signal to the TPA when the configuration state of the trustee platform does not match the trusted configuration state. The TPA is further responsible for the delivery of the distrust signal to the trustor's platform.

In accordance with another embodiment of the invention, a method of providing conditional trust between a MIDlet provider and a Mobile Information Device (MID) is provided. The method comprises attaching trust conditions to a MIDlet suite contained within the MIDlet provider, downloading the MIDlet suite and attached trust conditions to the MID, checking the trust conditions against a configuration of the MID to determine a difference between the trust conditions and the configuration, and reporting the difference to the MIDlet provider.

In accordance with another embodiment of the invention, a method for establishing and maintaining conditional trust between a trustee and a trustor is provided. The method comprises generating metrics by the trustor that represents a trusted condition, sending the trusted condition to the trustee for a conditional trust reference, generating metrics by the trustee according to the conditional trust reference at the trust attestation stage for an intended purpose, registering the conditional trust reference at a trusted computing platform CAN within the trustee, checking the trustee generated metrics against current metrics of the trustee according to the conditional trust reference, and issuing a distrust signal by the trustee in response to a mismatch between the conditional trust reference and the current metrics of the trustee.

In accordance with another embodiment of the invention, a method of providing conditional trust between a content provider and a device is provided. The method comprises attaching trust conditions to content contained within the content provider, downloading the content and attached trust conditions to the device, checking the trust conditions against a configuration of the device to determine a difference between the trust conditions and the configuration, and reporting the difference to the content provider.

These and various other advantages and features of novelty which characterize the invention are pointed out with greater particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

A portion of the disclosure of this patent document contains material which is subject to copyright protection. The copyright owner has no objection to the reproduction of the patent document or the patent disclosure, as it appears in the Patent and Trademark Office patent file or records, but otherwise reserves all copyrights and associated copyright ownership privileges.

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to a method and system that defends against any malicious behavior occurring between a trustor and a trustee after the trustee has gained the trust of the trustor. The present invention matches up trust characteristics completely by establishing and maintaining the trust to the trustee in terms of some intended purpose under preferred conditions specified by the trustor ahead of time. In so doing, the fundamental characteristic of trust may be supported.

Open platforms are general purpose computing platforms where there is no a priori trust established between the hardware of the platform and a third party that could be used to prove the functionality of the platform. Examples of open platforms include workstations, mainframes, Personal Digital Assistants (PDA), and PCs. Open platforms possess many practical benefits over closed platforms, but unfortunately, a remote party cannot make any assumptions about how that platform will behave or misbehave.

Closed platforms are special purpose computing devices that interact with the user via a restricted interface, e.g., automated tellers, game consoles, and satellite receivers. Closed platforms contain mechanisms that restrict modifications to its software. A closed platform can authenticate itself as an authorized platform to a remote party using a secret key embedded in the platform during manufacturing. Closed platforms rely on hardware tamper resistance to protect the embedded secret key and ensure well-behaved operation, but severely limit flexibility of applications.

Trusted platforms, on the other hand, provide the best properties of open and closed platforms. As with open platforms, trusted platforms allow applications from many different sources to run on the same platform. As with a closed platform, remote parties can determine what software is running on a platform and thus determine whether to expect the platform to be well behaved.

Figure 1:
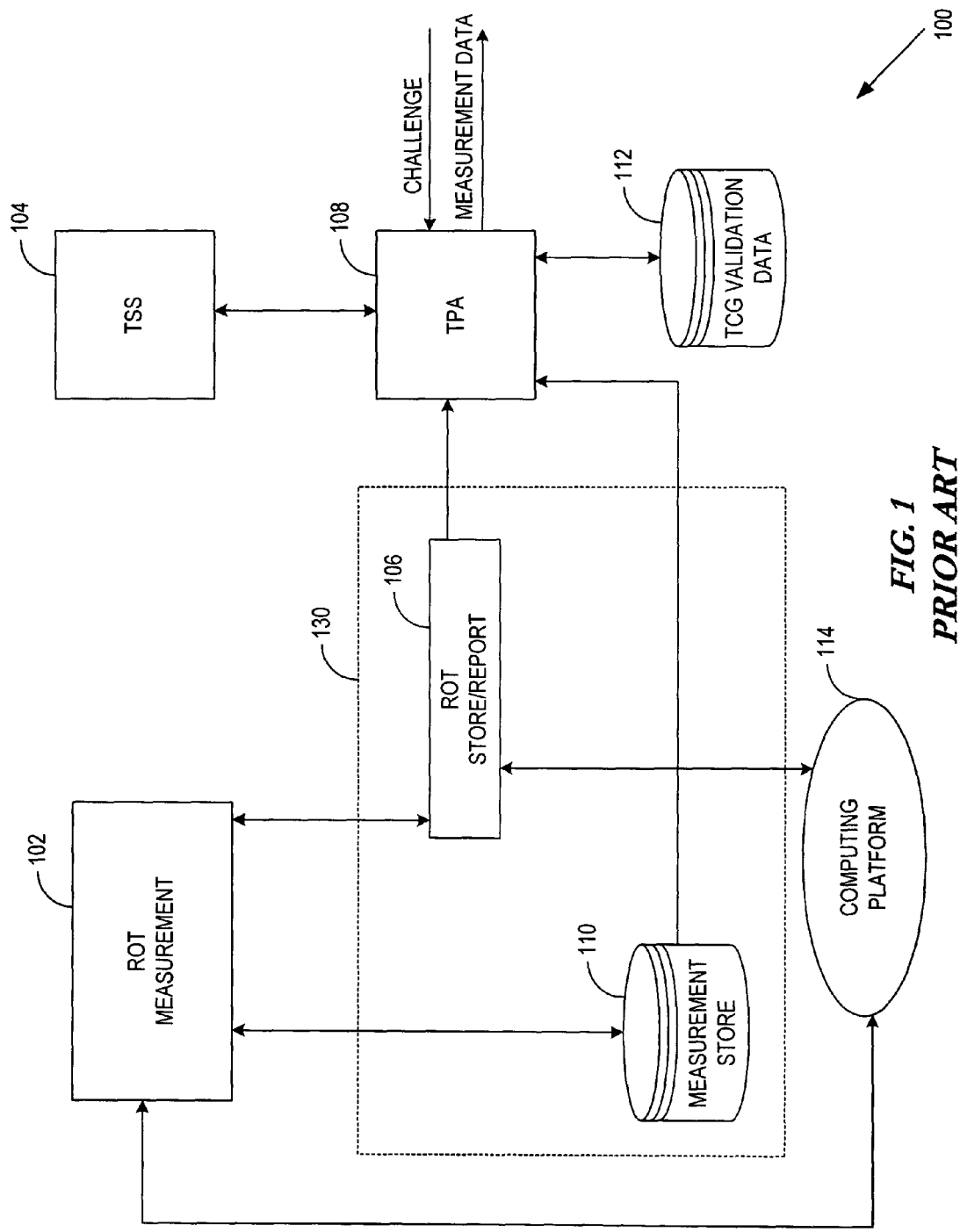
FIG. 1 illustrates a Trusted Platform Subsystem (TPS) in accordance with the prior art.

Trusted Platform Subsystem (TPS) 100 according to the prior art is illustrated in FIG. 1. TPS 100, among other things, enables an entity to determine the state of the hardware and software environment in TPS 100 and to seal data to a particular configuration within TPS 100. The entity deduces whether the state of the computing environment in TPS 100 is acceptable and performs some transaction with TPS 100. If the transaction involves sensitive data that must be stored on TPS 100, the entity can ensure that the data is held in a confidential format unless the state of the computing environment in TPS 100 is acceptable to the entity.

TSS 104 provides mechanisms for cryptographically reporting the current hardware and software configuration of computing platform 114 to local and remote challengers. TSS 104 also provides a limited protected storage capability, which allows the owner of TPS 100 to store an acceptable platform configuration, biometric data, or other data that is available early during system boot. System firmware or other software may use this storage capability to name users who are qualified to log on, or to store acceptable boot configurations. TSS 104 also provides a facility whereby platform software or firmware may store secrets that are accessible only when the platform is in a defined configuration, a mechanism known as sealing.

TPS 100 provides reliable information via signal MEASUREMENT DATA to enable the challenging entity to deduce the hardware/software environment in TPS 100. At the same time, TPS 100 provides a means to encrypt cryptographic keys and to state the software environment that must be in place before the keys can be encrypted. Both functions of TPS 100 require integrity metrics, which consist of data reflecting the integrity of the configured state of TPS 100. Both functions require two roots of trust: Root of Trust (ROT) 102 for measuring integrity metrics; and ROT 106 for storing and reporting integrity metrics. ROT 102 measures certain platform characteristics, logs the measurement data into measurement store 110, and stores the final result in ROT 106.

When an integrity challenge, e.g., CHALLENGE, is received, Trusted Platform Agent (TPA) 108 gathers the final results from ROT 106, the log of measurement data from trusted platform measurement store 110, and Trusted Computing Group (TCG) validation data 112 that states the values that the measurements should produce in a platform that is working correctly. TPA 108 then sends the gathered data, e.g., MEASUREMENT DATA, to the challenging entity, who then uses the data to check that it is consistent with the final results and then compares the data with the TCG validation data. This comparison allows the challenging entity to deduce the configured state of TPS 100 and consequently decide whether it is satisfied to trust TPS 100 for its intended purpose.

Once the challenging entity has determined that TPS 100 can be trusted, the challenging entity can use TPM 130 to store keys alongside stated values of integrity metrics, such that TPM 130 will not release the keys unless the current measured values of integrity metric match the stated values of integrity metric. Both ROT 102 and 106 and Trusted Platform Support Services (TSS) 104 are implemented in ways that enable confidence in their correct operation in all circumstances of interest. The implementation of ROT 102 typically varies depending upon the type of platform that it resides upon, e.g., PC, server, or mobile terminal. TPM 130 is defined as the set of all trusted capabilities aside from ROT 102 because these are independent of the type of platform used.

Each entry in the log inside measurement store 110 of TPM 130 contains a description of a measured entity plus an appropriate integrity metric that has been recorded inside TPM 130. The log can be used to reproduce the value of each sequence of integrity metrics inside TPM 130. If the log and the TPM are consistent and if the TPM is trustworthy, the log can also be trusted. If the values derived from the log and the values reported by the TPM are the same, the log is presumed to be an accurate record of the steps involved in building the software environment on computing platform 114. Any difference between the values derived from the log and the values reported by the TPM indicate an undesirable inconsistency in the configuration state of computing platform 114.

A large number of integrity metrics may be measured that reflect the configuration state of computing platform 114, whereby a particular metric may change with time, thus requiring a new value to be stored. TPS 100 provides a way to store sequences of integrity metrics, rather than overwrite old metric values with newly computed values. Values of integrity metrics are not stored within TPS 100, but are rather appended to a sequence. The new value of an integrity metric is concatenated to the existing value of the sequence, a digest is computed for the concatenation, and the digest is then used as the new representation of the sequence. In this way, one or more sequences may be used to represent an arbitrary number of integrity metrics and their updates.

An entity seeking to know the state of the computing environment inside TPS 100 depends critically on the value of the integrity metrics. The integrity metrics enable an entity to determine the consistency of the measurement information and to compare the actual and expected status of the platform. The integrity metrics themselves, therefore, must be reported by a trusted mechanism, i.e., TPM 130. TPM 130 proclaims its trustworthiness by signing data using one of its identities and conventional cryptographic techniques. The signature key is known only to TPM 130 and is the private key of a key pair. The corresponding public key is an identity key, since it is a cryptographic value by which TPM 130 is known, therefore, the public key is part of an identity of TPM 130.

Figure 2:
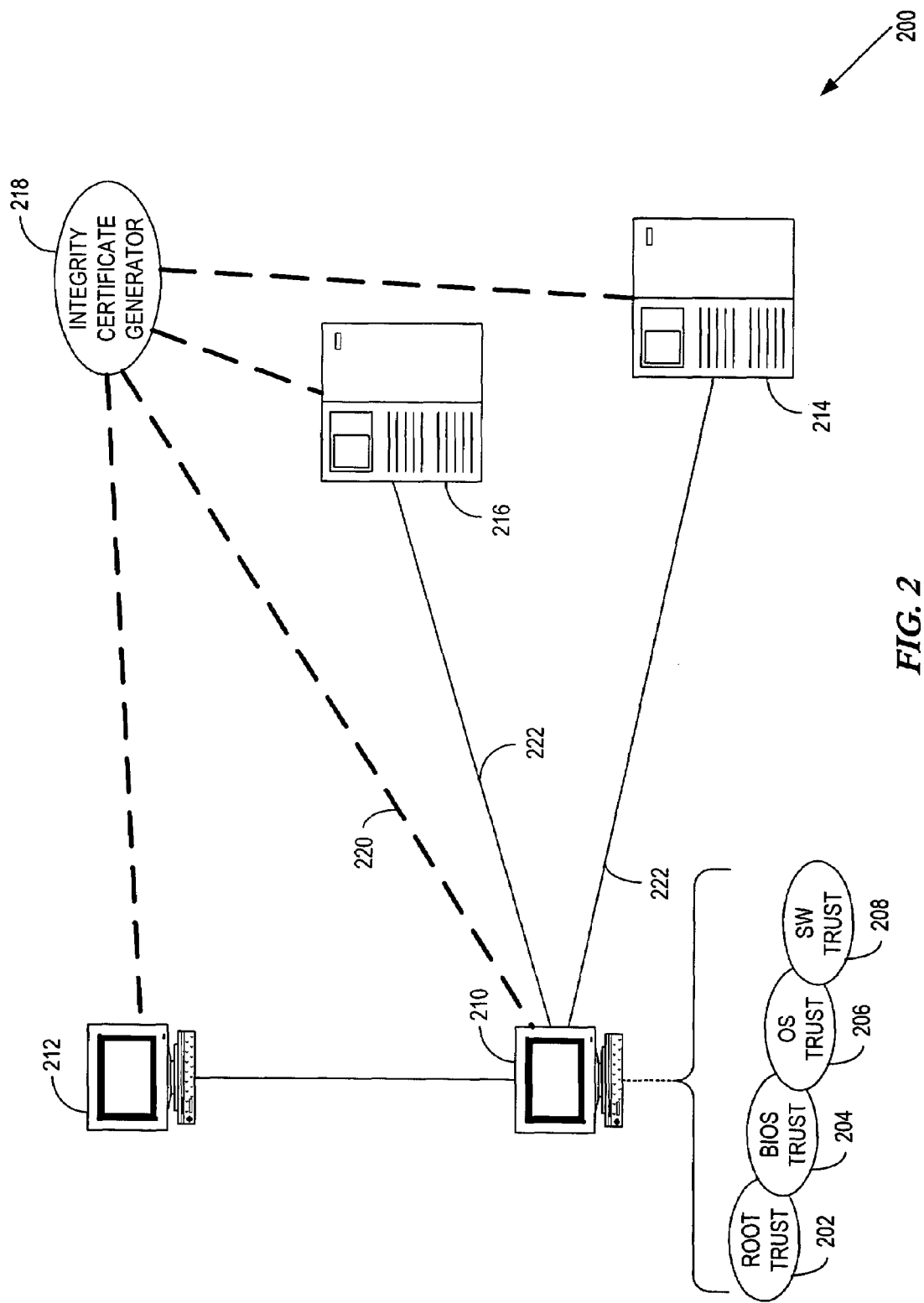
FIG. 2 illustrates an exemplary network of trusted platforms and challenging entities according to the present invention.

TCPA compliant system 200 of FIG. 2 illustrates an exemplary network of trusted platforms and challenging entities according to the present invention. Layers 202-208 of workstation 210 represent a trust chain that is specified by the TCPA. The TCPA provides stronger authentication of platforms, e.g., workstations 212 and 210, and enhances the integrity of internal and external networks, such as for example, Enterprise TCPA compliant system 216 and e-Business TCPA compliant system 214.

Root trust 202 is realized through the TCPA subsystem, which typically consists of a root trust for measuring integrity metrics, a TPM, and a TSS. The integrity metrics consists of data that reflects the integrity of the hardware/software state of the trusted platform. The TPM is generally implemented using an Integrated Circuit (IC) that is internal to workstations 212 and 210. When power is applied, the TPM IC takes charge by first checking the boot Read Only Memory (ROM) that it expects, executes it, and then measures the state of the machine against a known safe metric to establish BIOS trust 204. Once BIOS trust 204 has been verified, Operating System (OS) trust 206 is established by first checking the OS loader, which is responsible for loading system Software (SW) executables and then checks the OS kernel to establish OS trust 206. The OS kernel then checks a list of legitimate SW to create SW trust 208, which then uses the OS resources to authenticate local and remote data. As can be seen, the TCPA extends the trust based on root trust 202 by setting up trust chain 202-208. Once the TPM IC knows the metric of one item, it can expand the list of trusted items by checking the metric of each layer. In this way, the TPM IC can expand its trust boundary on verified hardware and software. The TCPA makes use of integrity metrics to inspect the trust chain by its previous chain and detects the misbehavior of the chain after root trust 202 to include the behavior of remote parties.

The process of dynamically establishing that a platform conforms to the specification expected by a remote party is done through a process called attestation. Attestation consists of several steps of cryptographic authentication by which the specification for each layer of the platform is checked from the hardware up to the operating system and application code. Attestation is then extended to remote workstations, PCs, and other network entities to expand the trust boundary. At a high level, the steps of attestation are as follows.

A hardware platform, e.g., workstation 210, has a signing key, $K_{sign}$, and a public key certificate, $C_{hw}$, for this key that is issued by, for example, integrity certificate generator 218 via path 220. When an application, e.g., application A, is executed on workstation 210 for example, it generates a public/private key pair, $PK_A/SK_A$. Next, the application requests the workstation to certify its public key $PK_A$, to which the workstation uses its signing key $K_{sign}$ to generate a certificate for $PK_A$, which is denoted $C_A$. Along with standard certificate fields, the certificate $C_A$ contains the hash of the executable image of the application A. The signed certificate $C_A$ is then returned to the application.

When the application wants to attest its validity to a remote server, e.g., Enterprise TCPA compliant system 216 or e-Business TCPA compliant system 214, it sends the integrity metrics, e.g., certificate chain ($C_{hw}, C_A$), to the remote server as part of the response to the challenge depicted in path 222. The server then checks two things: the signatures on both certificates are valid and that $C_{hw}$ is not revoked; and that the application hash embedded in $C_A$ is on the server's list of applications it trusts. At this point, the server is assured that $C_A$ comes from an application that it trusts. The application is now able to authenticate itself by proving its knowledge of private key $SK_A$.

TCPA compliant system 200 adds special value such as authentication, integrity and privacy to a Business-to-Business (B2B) Public Key Infrastructure (PKI) deployment. In a buyer/supplier model, for example, TCPA capability enables a buyer and a supplier to issue a challenge, e.g., 222, to the buyer/supplier platform to determine that it is a trusted system. After convincing the mutual trust between the supplier and the buyer, both of the transaction parties can conduct business remotely. TCPA compliant system 200 may also support an Enterprise virtual private network, in order to enable access by employees located in remote sites. The trust is built by obtaining integrity metrics in the remote platform, securely storing these metrics in the remote platform, and then ensuring the report of metrics from the remote platform is secure through attestation.

Attestation, however, only allows a remote party to ascertain what configuration was launched on a particular platform and establishes a session key for future interaction with that configuration on that particular platform. This does not provide trustworthiness in the usual sense because a software component could be buggy and produce incorrect results. Additionally, attestation provides no information about the current state of the running system, such as a software component that has been compromised by a buffer overflow attack, infected by a virus, replaced by a newer version of code, etc.

Figure 3:
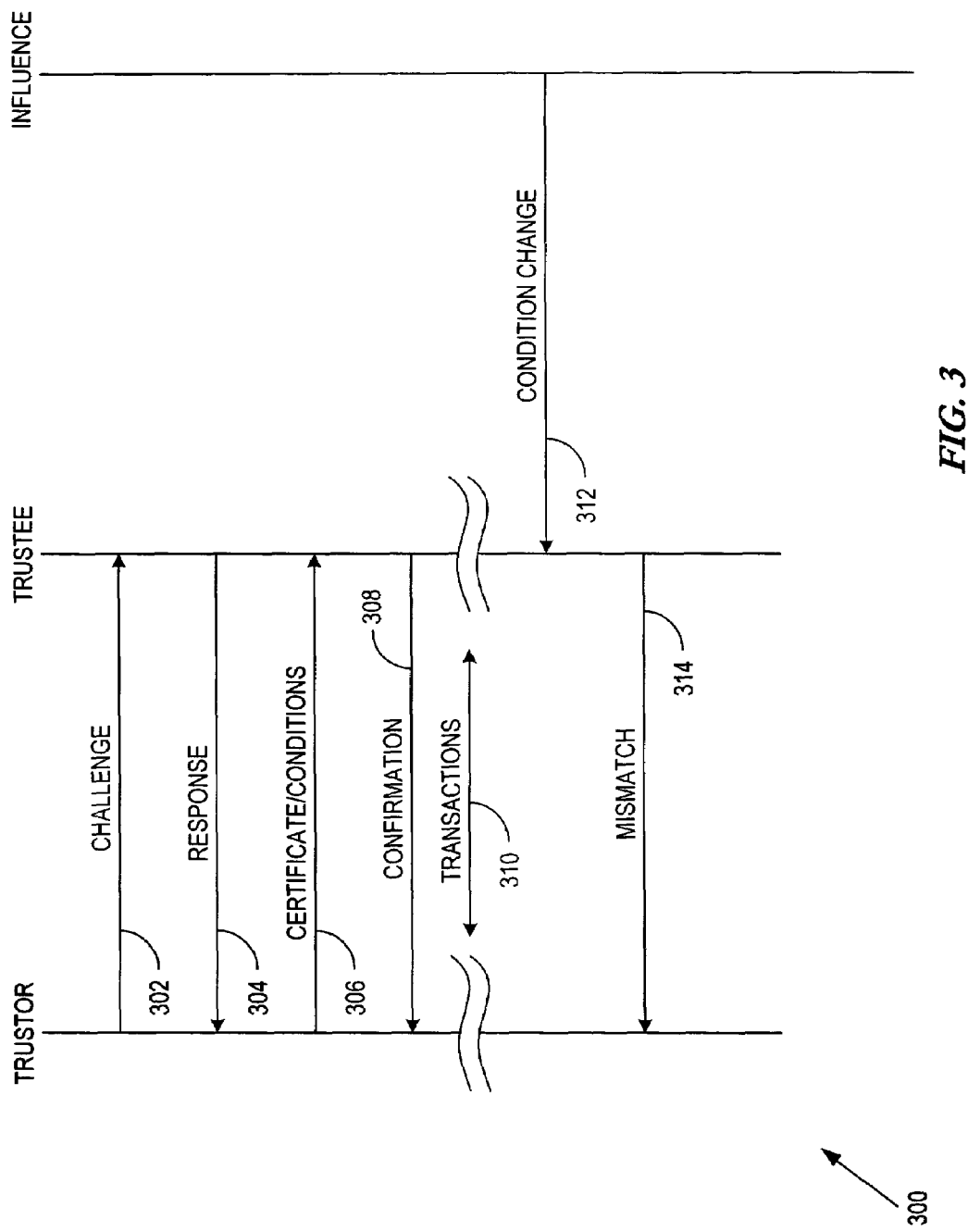
FIG. 3 illustrates an exemplary message flow according to the present invention.

Message flow 300 of FIG. 3 illustrates an exemplary message flow diagram according to the present invention that provides signalling of an altered software or hardware component after attestation has taken place between a trustor and a trustee. The altered component(s) is(are) identified by the trustee and the appropriate signalling is then generated by the trustee to the trustor.

Message flows 302 and 304 represents the initial attestation between trustor and trustee that allows the trustor to establish a trust relationship with the trustee as discussed above. The trustee's platform change may be monitored, compared, and reported according to the pre-defined trust conditions specified by the trustor for the intended purpose. These trust conditions are confirmed by the trustee during the trust attestation. Message flows 306 and 308 represents further attestation between trustor and trustee that establishes trust conditions for a special purpose. For example, the trustor wishes to bootstrap the trustee as to the particular software applications that may be executed on the computing platform of the trustee. Once the trustee has agreed to the bootstrap, confirmation 308 is generated by the trustee to guarantee to the trustor that the bootstrap will be adhered to and transactions 310 between the trustor and trustee may then proceed.

After some amount of time has transpired, condition changes 312 within the trustee's computing platform pose a threat to the trust gained by the trustor through confirmation 308. For example, a software update may have occurred on one or more of the software applications that was included in the bootstrap requested by the trustor causing the integrity metrics to change. Alternately, a hardware change or a hardware status change may have occurred within the trustee's computing platform to cause the integrity metrics to change. In any event, the trustee gathers all information relating to the integrity change taking place within its computing platform and signals the change to trustor via message 314. Message 314 may be delivered to the trustor via any pre-negotiated mechanism that is compatible to both trustee and trustor.

Figure 4:
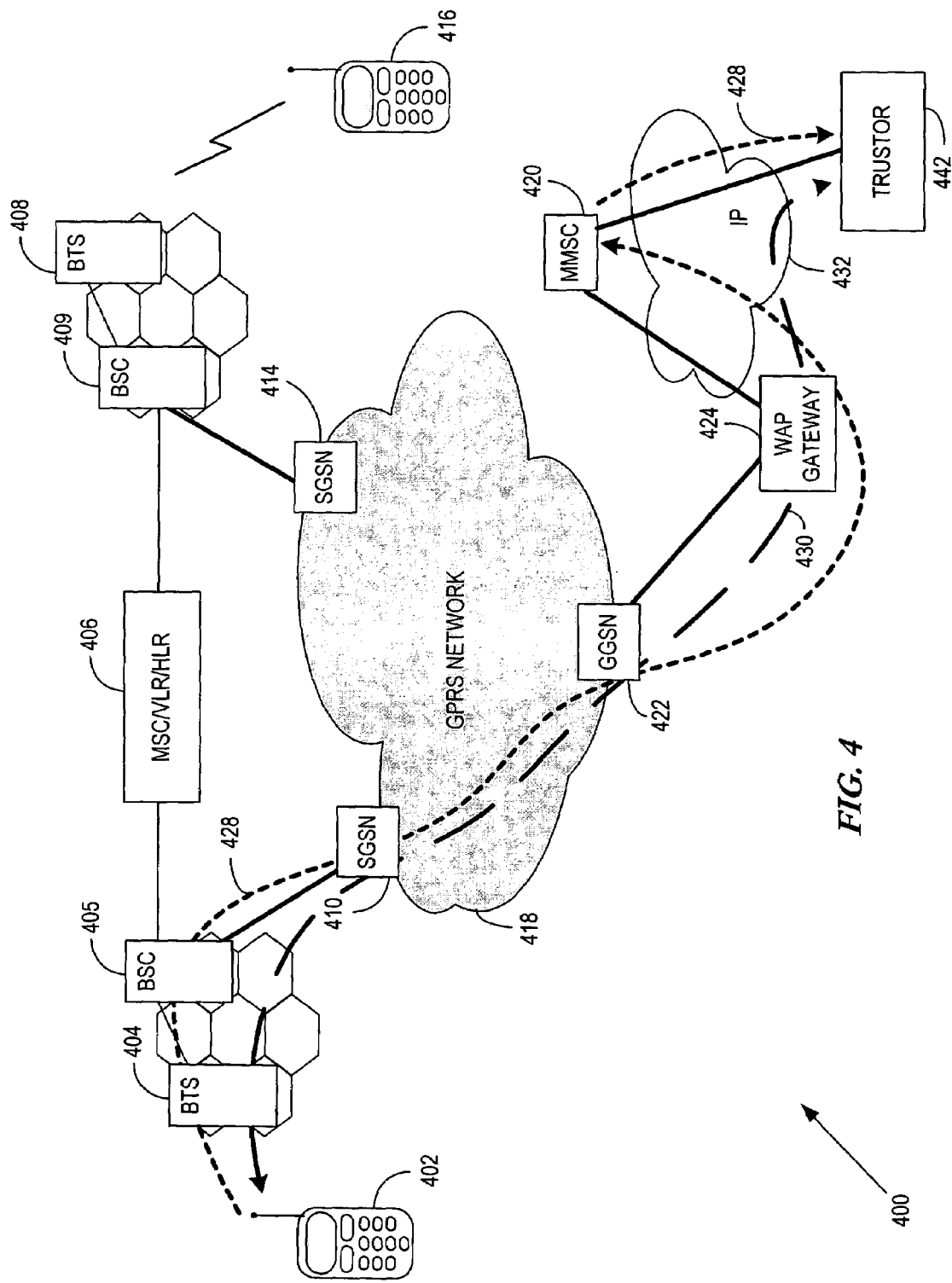
FIG. 4 illustrates an exemplary network in which the principles of the present invention may be practiced.

FIG. 4 illustrates exemplary General Packet Radio Service (GPRS) network 400 in which the principles of the present invention may be practiced. GPRS network 400 is used, for example, to not only conduct messaging depicted in messages 302-310 of FIG. 3 via path 430, but also to propagate the distrust signalling message 314 via path 428 using the Multimedia Messaging Service (MMS). MMS is based on a store and forward model, whereby the distrust signal is forwarded to the trustor via, for example, a GPRS network as illustrated in FIG. 4. GPRS is a packet-switched service for Global System for Mobile Communications (GSM) that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services. While the exemplary embodiments of FIG. 4 are generally described in connection with GPRS/GSM, it should be recognized that the specific references to GSM and GPRS are provided to facilitate an understanding of the invention. As will be readily apparent to those skilled in the art from the description provided herein, the invention is equally applicable to other technologies, including other circuit-switched and packet-switched technologies, 3G technologies, and beyond.

Referring to FIG. 4, mobile terminals 402 and 416 communicate with Base Transceiver Station (BTS) 404 and 408, respectively, via an air interface. BTS 404 and 408 are components of the wireless network access infrastructure that terminates the air interface over which subscriber traffic is communicated to and from mobile terminals 402 and 416. Base Station Controller (BSC) 405 and 409 are switching modules that provide, among other things, handoff functions, and power level control in each BTS 404 and 408, respectively. BSC 405 and 409 controls the interface between a Mobile Switching Center (MSC) 406 and BTS 404 and 408, and thus controls one or more BTSs in the call set-up functions, signaling, and in the use of radio channels. BSC 405 and 409 also controls the respective interfaces between Serving GPRS Support Node (SGSN) 410 and BTS 404 and SGSN 414 and BTS 408.

SGSN 410 serves a GPRS mobile terminal by sending or receiving packets via a Base Station Subsystem (BSS), and more particularly via BSC 405 and 409 in the context of GSM systems. SGSN 410 and 414 are responsible for the delivery of data packets to and from mobile terminals 402 and 416, respectively, within the service area, and performs packet routing and transfer, mobility management, authentication, charging functions, etc. In the exemplary GPRS embodiment shown in FIG. 4, the location register of SGSN 410 stores location information such as the current cell and Visiting Location Register (VLR) associated with mobile terminal 402, as well as user profiles such as the International Mobile Subscriber Identity Number (IMSI) of all GPRS users registered with SGSN 410. SGSN 414 performs similar functions relating to mobile terminal 416. SGSN 410 and 414 are ultimately coupled to MMSC 420 in connection with the presently described embodiment. While GSM forms the underlying technology, SGSN 410 and 414 described above are network elements introduced through GPRS technology. Another network element introduced in the GPRS context is the Gateway GPRS Support Node (GGSN) 422, which acts as a gateway between the GPRS network 418 and WAP gateway 424.

Multimedia Messaging Service Center (MMSC) 420 provides messaging capabilities for the delivery of multimedia messages composed of text, photographs, video, and other media types. The messaging capabilities include mobile originated messages sent to other mobile terminals or applications and application originated messages sent to mobile terminals or other applications. MMSC 420 is responsible for storing incoming and outgoing MMS messages, as well as the transfer of messages between different messaging systems.

With the aforementioned network system described as a representative network environment, a trusted messaging scenario is now described in which a WAP Push Framework is utilized to deliver the distrust signalling according to the principles of the present invention. Dashed line 430 represents, for example, the messaging path used for transfer of messages 302-310 of FIG. 3. Dashed line 428 represents the source multimedia message from mobile terminal 402, which is ultimately posted to MMSC 420. Mobile terminal 402 is acting as a mobile server to trustor 442, whereby trusted content is transferred via path 430 until such time that a configuration change within mobile terminal 402 causes distrust signalling to report the configuration change. The distrust signalling is received by trustor 442 via MMSC 420 from mobile terminal 402, in which case trustor 442 must decide which action to take next.

The WAP protocol suite is used as the data transport mechanism because WAP provides data transport services that are optimized for mobile networks. WAP also provides uniform transport services regardless of the underlying network. In particular, the Wireless Session Protocol (WSP) layer supplies the basis of the transport mechanism. Distrust signalling via, for example, an MMS message is sent by mobile terminal 402 for delivery to trustor 442 via an M-Send.req Protocol Data Unit (PDU) which contains the Multipurpose Internet Mail Extensions (MIME) encapsulated MMS message content. Either the address of trustor 442 or a token representing the address of trustor 442 is provided within the PDU, along with the content type of the PDU. Dashed line 428 indicates the M-Send.req PDU message flow from mobile terminal 402 to MMSC 420. While WSP provides the wireless transport from mobile terminal 402 to WAP gateway 424, HTTP is used to complete the post request message progression to MMSC 420. WAP gateway 424 provides the necessary functionality required to support HTTP encapsulation as required to support multimedia messaging to MMSC 420. It should be noted that although MMS is illustrated in FIG. 4 as the distrust signalling transport, alternate methods of transport may be used, such as the Short Messaging Service (SMS). In other embodiments, proximity communications using Bluetooth or Infrared (IR), for example, may be used to communicate the distrust signalling. Wired communications may also be used for distrust signalling transport such as specified by the RS232 or RS432 standards, and also may include differential data transmission formats such as specified by the RS422 or RS485 standards. Other wired implementations for higher bandwidth considerations may use the Universal Serial Bus (USB), or FireWire, specifications for example.

Figure 5:
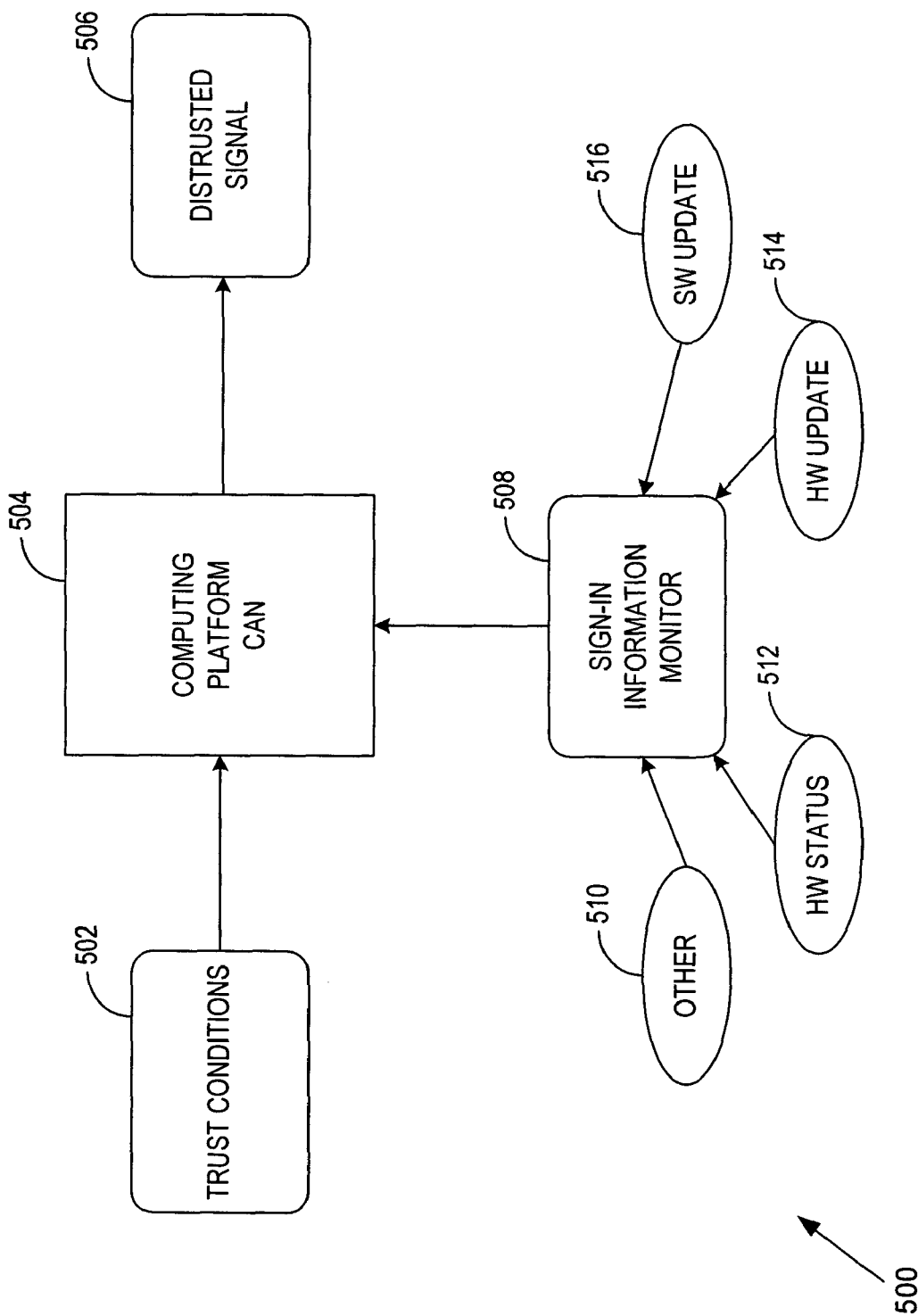
FIG. 5 illustrates an exemplary distrust signal reporting system in accordance with the present invention.

FIG. 5 illustrates exemplary distrust signal reporting system structure 500 that may be employed by a trustee to detect and signal a change to the trustee's computing platform's configuration or state change. A trustee may be represented by any number of computing terminals to include mobile terminals, Personal Digital Assistants (PDA), laptop computers, PCs, workstations, etc. Trust conditions 502 represents the required bootstrap as communicated by the trustor (not shown) that prescribes the set of hardware and software functionalities or status that may be employed by the trustee, such that the trustor is able to maintain a trust relationship with the trustee.

Computing platform CAN 504 receives the trust conditions 502 and checks them against sign-in information monitor 508 of the trustee. Contributing to sign-in information monitor 508 are software (SW) updates 516, hardware (HW) updates 514, HW status 512, and other 510, which are combined by sign-in information monitor 508 to calculate a configuration image that represents the current execution state of the trustee. HW status 512 may represent a change in the operational state of the trustee's hardware indicating, for example, that a Universal Serial Bus (USB) is non-functional, or that a memory check has failed. SW updates 516 may occur when upgrading to a more recent version of an application executing on the trustee. HW update 514 may occur, for example, when expanding the Random Access Memory (RAM) allocation for the trustee. Other 510 may alter the image of the trustee when, for example, a new user has logged into the trustee.

In one embodiment according to the present invention, integrity metrics may be measured at regular intervals, whereby sign-in information monitor 508 collects any configuration data available from inputs 510-516 and calculates the image relating to the current configuration of the trustee. In another embodiment according to the present invention, a detection mechanism may be employed to detect any of configuration changes 510-516 to cause a recalculation of integrity metrics. Computing platform CAN 504 checks trust conditions 502 received from the corresponding trustor against sign-in information monitor 508 to detect any differences. All differences are then formulated into distrust signal 506 and then communicated to the trustor. The trustor then must decide the next step to take in response to the distrust signal.

Figure 6:
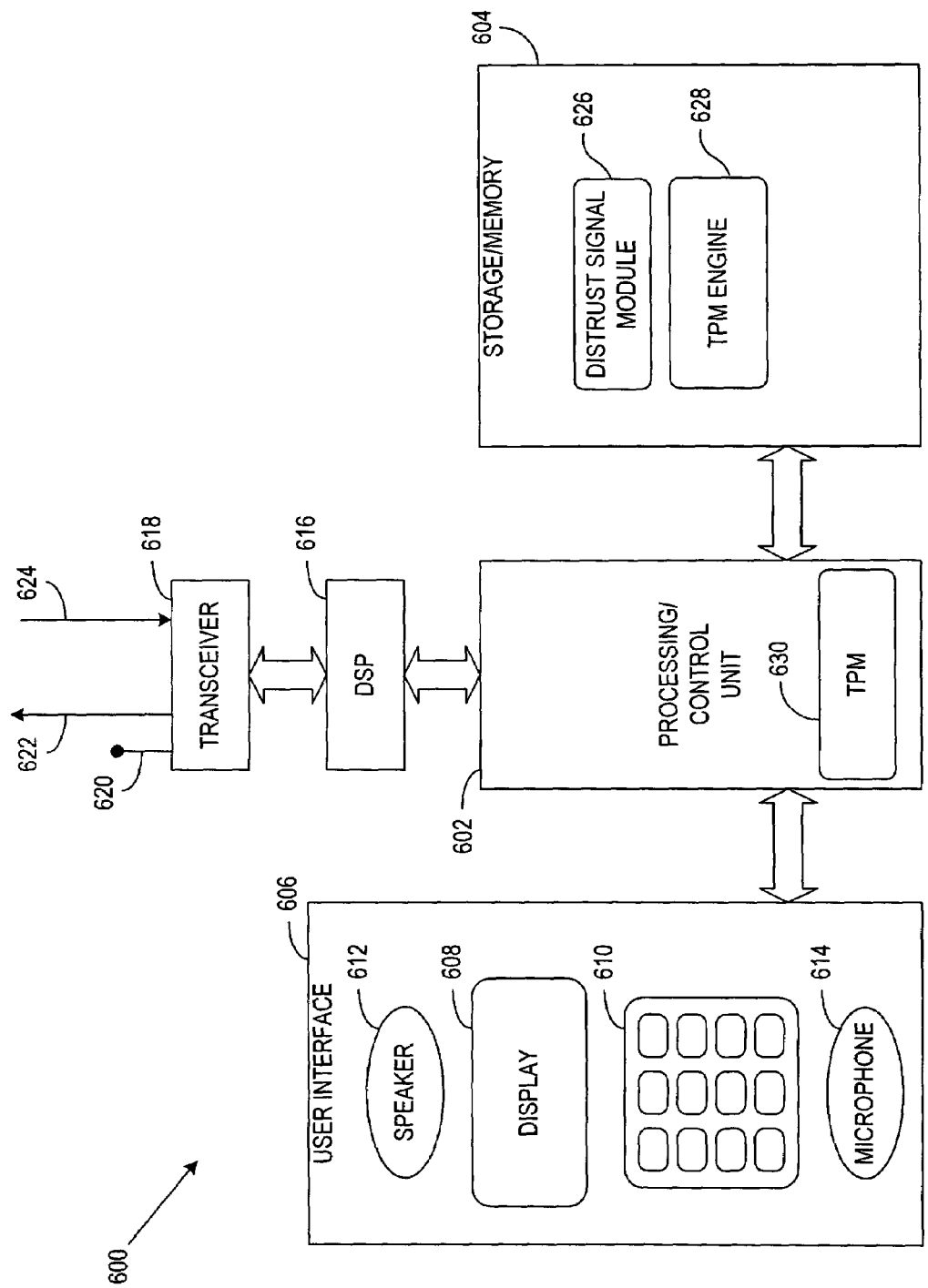
FIG. 6 illustrates a representative mobile computing arrangement in accordance with the present invention.

The invention is a modular invention, whereby processing functions within either a TPM enabled mobile terminal or server may be utilized to implement the present invention. The mobile devices may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various trusted messaging functions described herein. An example of a representative mobile terminal computing system capable of carrying out operations in accordance with the invention is illustrated in FIG. 6. Those skilled in the art will appreciate that the exemplary mobile computing environment 600 is merely representative of general functions that may be associated with such mobile devices, and also that landline computing systems similarly include computing circuitry to perform such operations.

The exemplary mobile computing arrangement 600 suitable for facilitating trusted communications in accordance with the present invention may be associated with a number of different types of wireless devices. The representative mobile computing arrangement 600 includes a processing/control unit 602, such as a microprocessor, reduced instruction set computer (RISC), or other central processing module. The processing unit 602 need not be a single device, and may include one or more processors. For example, the processing unit may include a master processor and associated slave processors coupled to communicate with the master processor. The processing unit also includes a TPM chip 630 used to establish mobile computing arrangement 600 as a trusted computing platform.

The processing unit 602 controls the basic functions of the mobile terminal, and also those functions associated with the present invention as dictated by distrust signal module 626 and TPM engine 628 available in the program storage/memory 604. TPM engine 628 facilitates communications between TPM 630 and distrust signal module 626 in order to fulfill the functions in accordance with the present invention. Thus, the processing unit 602 is capable of calculating its own configuration image and generating a distrust signal if the configuration image does not match previously agreed upon trust conditions. The functionality described in relation to distrust signal reporting system structure 500 of FIG. 5 may, however, be distributed throughout mobile computing arrangement 600. That is to say that distrust signal module 626 and TPM engine 628 may be components that reside within TPM 630, within processor 602, or distributed between TPM 630 and processor 602. Alternately, the functionality represented by TPM 630, distrust signal module 626, and TPM engine 628 may all be incorporated within processor 602 to provide a completely integrated processor in accordance with the present invention.

The program storage/memory 604 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the invention, the program modules associated with the storage/memory 604 are stored in non-volatile electrically-erasable, programmable ROM (EE-PROM), flash ROM, etc. so that the information is not lost upon power down of the mobile terminal. The relevant software for carrying out conventional mobile terminal operations and operations in accordance with the present invention may also be transmitted to the mobile computing arrangement 600 via data signals, such as being downloaded electronically via one or more networks, such as the Internet and an intermediate wireless network(s).

The processor 602 is also coupled to user-interface 606 elements associated with the mobile terminal. The user-interface 606 of the mobile terminal may include, for example, a display 608 such as a liquid crystal display, a keypad 610, speaker 612, and microphone 614. These and other user-interface components are coupled to the processor 602 as is known in the art. Other user-interface mechanisms may be employed, such as voice commands, switches, touch pad/screen, graphical user interface using a pointing device, trackball, joystick, or any other user interface mechanism.

The mobile computing arrangement 600 also includes conventional circuitry for performing wireless transmissions. A digital signal processor (DSP) 616 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 618, generally coupled to an antenna 620, transmits the outgoing radio signals 622 and receives the incoming radio signals 624 associated with the wireless device.

The mobile computing arrangement 600 of FIG. 6 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a trusted computing system and method in accordance with the present invention.

Figure 7:
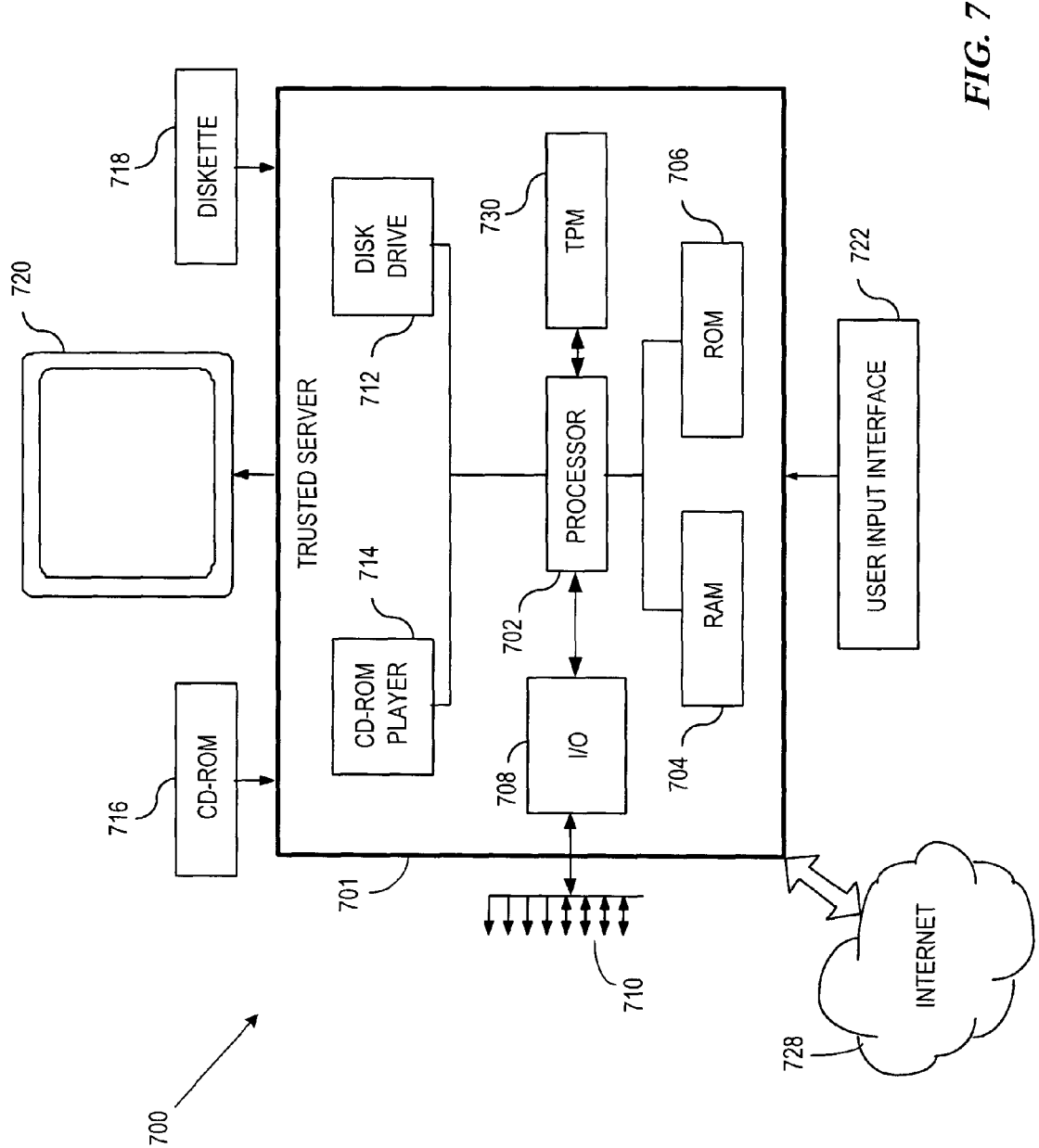
FIG. 7 is a representative computing system according to the present invention.

The trusted servers or other systems for providing trusted computing functions in connection with the present invention may be any type of computing device capable of processing and communicating digital information. The trusted servers utilize computing systems to control and manage the computing activity. An example of a representative computing system capable of carrying out operations in accordance with the invention is illustrated in FIG. 7. Hardware, firmware, software or a combination thereof may be used to perform the various trusted functions and operations described herein. The computing structure 700 of FIG. 7 is an example computing structure that can be used in connection with such a trusted system.

The example computing arrangement 700 suitable for performing the trusted computing activity in accordance with the present invention includes trusted server 701, which includes a central processor (CPU) 702 coupled to random access memory (RAM) 704, read-only memory (ROM) 706, and TPM chip 730. It should be noted that functions in accordance with the present invention may be imbedded within TPM chip 730, processor 702, or alternately separated from both of them and provided elsewhere. The ROM 706 may also be other types of storage media to store programs, such as programmable ROM (PROM), erasable PROM (EPROM), etc.

The processor 702 may communicate with other internal and external components through input/output (I/O) circuitry 708 and bussing 710, to provide control signals and the like. External data storage devices may be coupled to I/O circuitry 708 to facilitate trusted computing functions according to the present invention. Alternatively, such databases may be locally stored in the storage/memory of the server 701, or otherwise accessible via a local network or networks having a more extensive reach such as the Internet 728. The processor 702 carries out a variety of functions as is known in the art, as dictated by software and/or firmware instructions.

Trusted server 701 may also include one or more data storage devices, including hard and floppy disk drives 712, CD-ROM drives 714, and other hardware capable of reading and/or storing information such as DVD, etc. In one embodiment, software for carrying out the trusted computing operations in accordance with the present invention may be stored and distributed on a CD-ROM 716, diskette 718 or other form of media capable of portably storing information. These storage media may be inserted into, and read by, devices such as the CD-ROM drive 714, the disk drive 712, etc. The software may also be transmitted to trusted server 701 via data signals, such as being downloaded electronically via a network, such as the Internet. Trusted server 701 is coupled to a display 720, which may be any type of known display or presentation screen, such as LCD displays, plasma display, cathode ray tubes (CRT), etc. A user input interface 722 is provided, including one or more user interface mechanisms such as a mouse, keyboard, microphone, touch pad, touch screen, voice-recognition system, etc.

The trusted server 701 may be coupled to other computing devices, such as the landline and/or wireless terminals via a network. The server may be part of a larger network configuration as in a global area network (GAN) such as the Internet 728, which allows ultimate connection to the various landline and/or mobile client/watcher devices.

Figure 8:
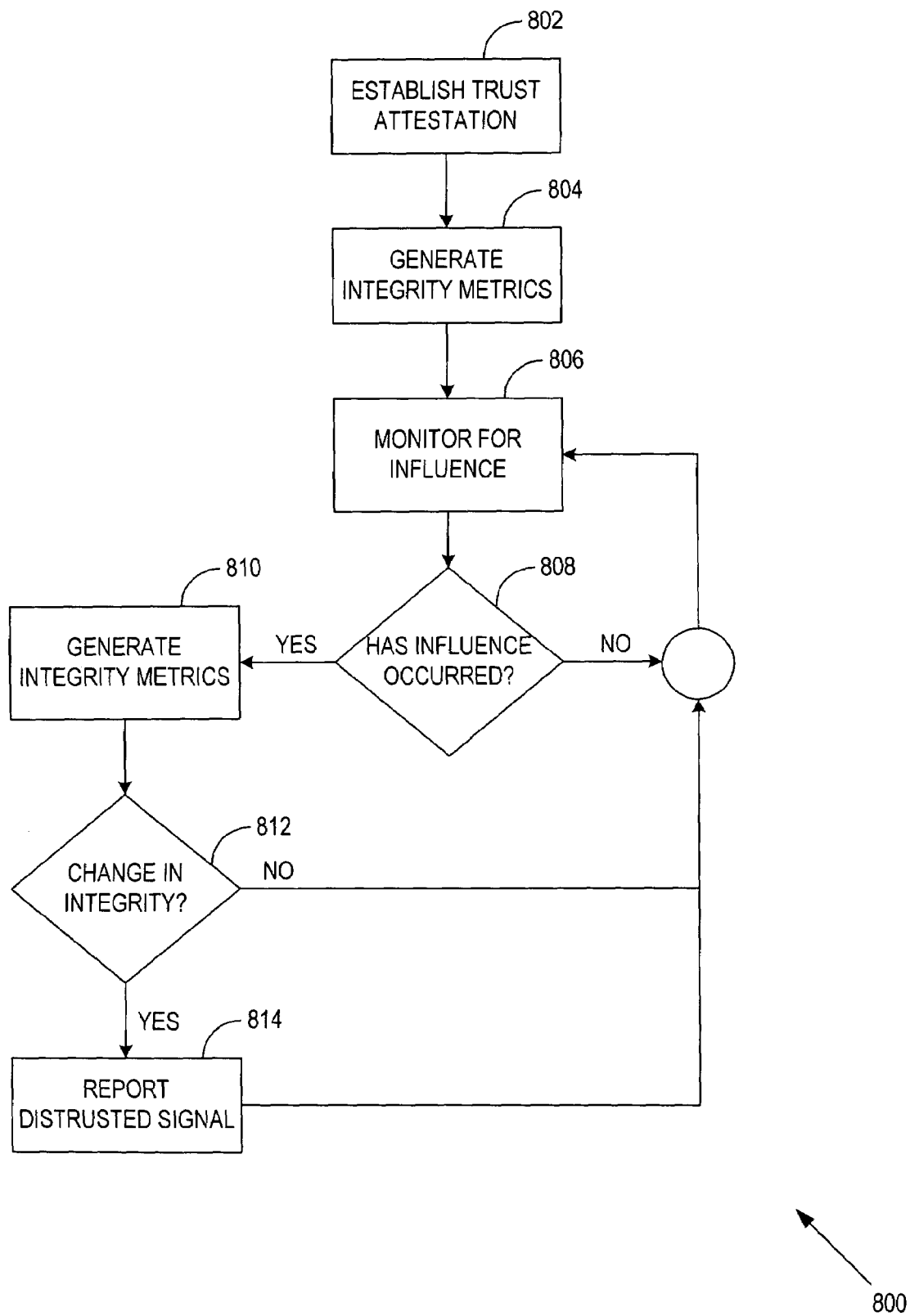
FIG. 8 illustrates a conditional trust procedure in accordance with the present invention.

A method according to the present invention that may be implemented by any trusted platform, e.g., mobile terminal or server, acting as a trustee in a trusted exchange with a trustor is exemplified by procedure 800 of FIG. 8. Procedure 800 provides a solution to establish and maintain conditional trust by stating distrust signals from a trustee's computing platform. In step 802, attestation of trust is established between a trustee and a trustor. The trustee operates TPS 100 as illustrated in FIG. 1, but in addition, also operates a distrust signal reporting system structure as depicted in FIG. 5.

In step 804, the trustor generates a set of integrity metrics that define the execution state of the trustee that is required in order for the trustor to maintain its trust in the trustee during the intended purpose. The trustee monitors sign-in information monitor 508 for any changes caused by influences 510-516 as in step 806. If an influence has occurred, it is detected in step 808 and sign-in information monitor 508 generates new integrity metrics in step 810 to include the effects of the influence. It should be noted, that influence monitor step 806 may be conducted according to the trust conditions. In other words, only those influences that pertain to the trust conditions are monitored, where the trust conditions may be used as a filter by influence monitor step 806 in order to reduce costs. The new integrity metrics are then delivered to computing platform CAN 504 whereby computing platform CAN 504 measures the difference between trust conditions 502 and the new integrity metrics. Any differences between trust conditions 502 and the newly generated sign-in information monitor 508 are detected in step 812 and reported by computing platform CAN 504 in the form of distrust signal 506 as in step 814.

Figure 9:
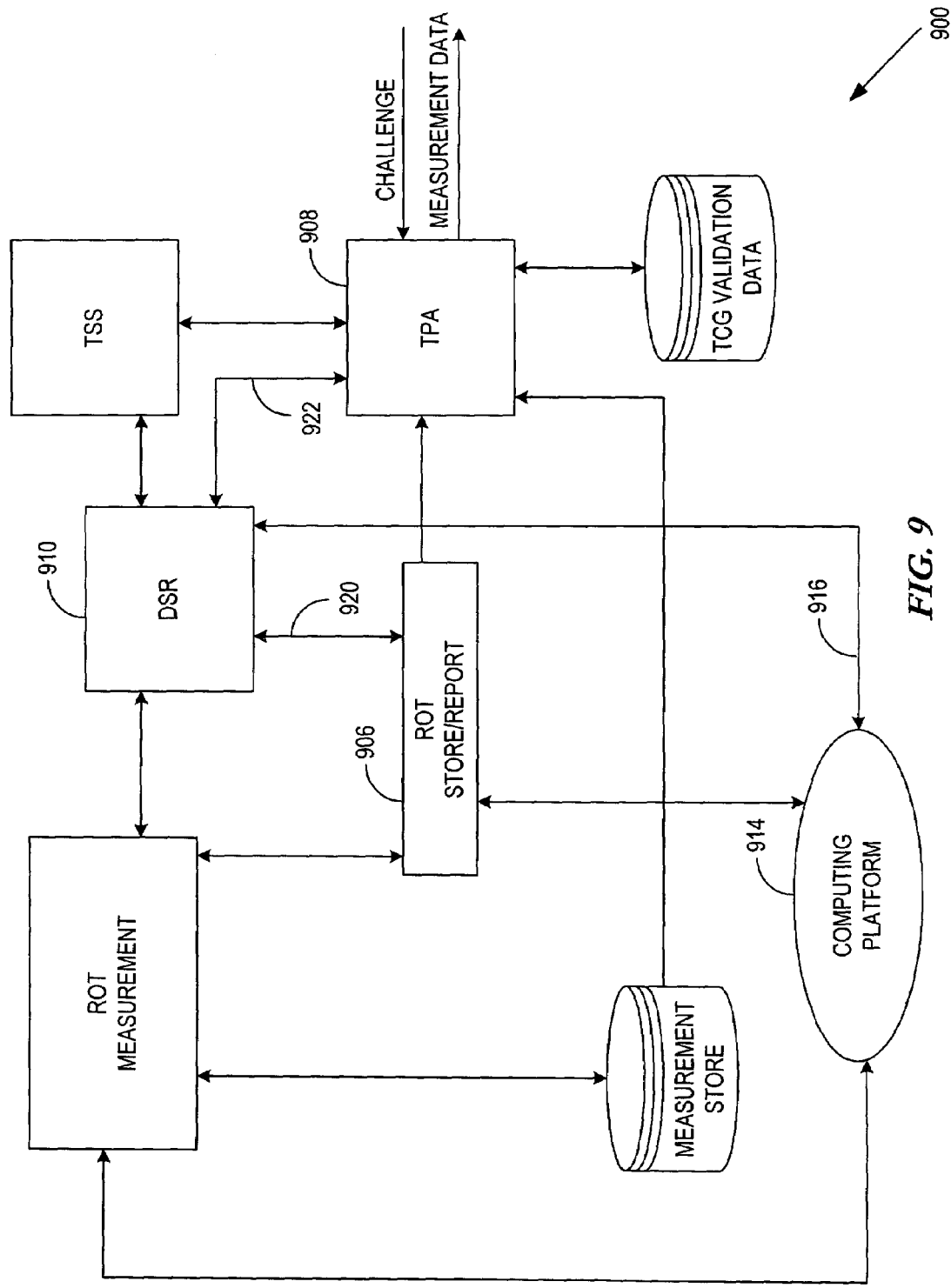
FIG. 9 illustrates an exemplary block diagram of an improved trust platform system in accordance with the present invention.

An improvement to the prior art trusted platform subsystem of FIG. 1 is exemplified by improved TPS 900 of FIG. 9 in accordance with the present invention. The operation of Distrust Signal Reporting (DSR) module 910 has been generally discussed above in relation to FIG. 5. Trust conditions 502 are received by DSR 910 via path 922 from TPA 908. Hardware and software monitor signals are received from computing platform 914 via path 916, whereby sign-in information monitor 508 receives them and computes the image that reflects the configuration of computing platform 914. Computing platform CAN 504 then checks the computed configuration against trust conditions 502 and stores the result in ROT 906 via path 920. If the check does not yield a match, the distrust signal 506 is generated and sent to TPA 908 via path 922. TPA 908 then transmits the distrust signal to the trustor so that the appropriate action may be taken by the trustor.

Another application where the advantages of the present invention are beneficial is associated with software applications that conform to the Mobile Information Device Profile (MIDP), e.g., MIDlets. MIDP is a set of APIs that define how software applications interface with, for example, mobile terminals and two-way pagers. J2ME is a highly optimized Java runtime environment, where J2ME technology specifically addresses the vast consumer space, which covers the range of extremely tiny commodities such as smart cards or a pager all the way up to the set-top box, an appliance almost as powerful as a computer.

Figure 10:
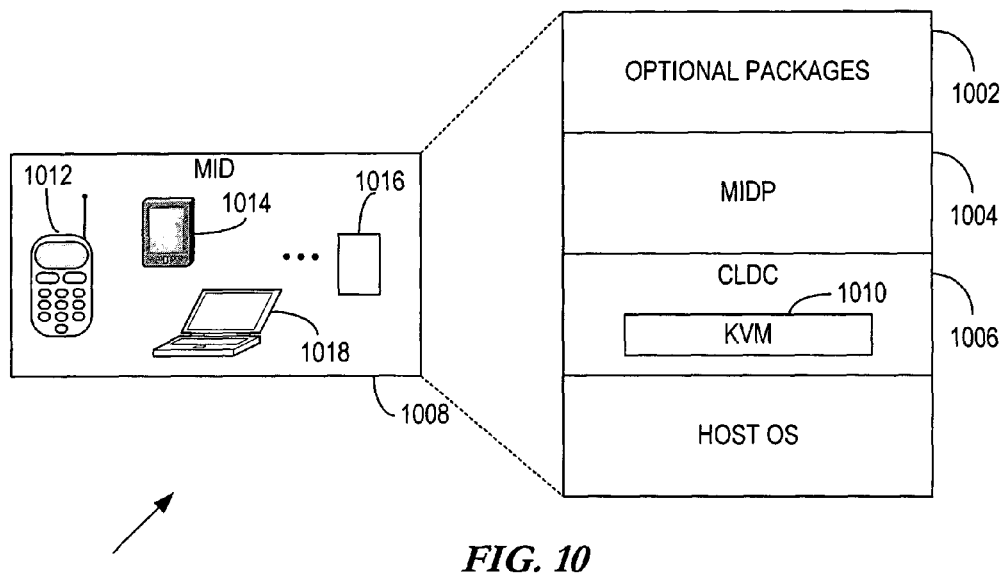
FIG. 10 illustrates a typical Java 2 Platform Micro-Edition stack.

The J2ME architecture defines configurations, profiles, and optional packages as elements for building complete Java runtime environments that meet the requirements for a broad range of devices and target markets. Each combination is optimized for the memory, processing power, and Input/Output (I/O) capabilities of a related category of devices. The result is common J2ME platform 1000 as illustrated in FIG. 10 that fully leverages each type of Mobile Information Device (MID) 1008 to deliver a richer user experience. MID 1008 may comprise any one of a mobile phone 1012, PDA 1014, laptop computer 1018, or other device 1016, such as a two-way pager, for example.

Connected Limited Device Configuration (CLDC) 1006 is a J2ME configuration that is comprised of a virtual machine and a minimal set of class libraries. CLDC 1006 provides the base functionality for a particular range of devices that share similar characteristics, such as network connectivity and memory footprint. CLDC 1006 is designed for MIDs 1008, that operate with intermittent network connections, slow processors, or limited memory.

MIDP 1004 offers the core application functionality required for mobile applications, including the user interface, network connectivity, local data storage, and application management. Combined with CLDC 1006, MIDP 1004 provides a complete Java runtime environment that leverages the capabilities of handheld devices and minimizes both memory and power consumption. J2ME platform 1000 is further extended by combining optional packages 1002 with CLDC 1006 to provide standard APIs for using both existing and emerging technologies, such as Bluetooth, Web Services, wireless messaging, multimedia, and database connectivity.

Kilo Virtual Machine (KVM) 1010 is a complete Java virtual machine that maintains all the aspects of the Java programming language, but runs in a resource constrained device having only a few hundred kilobytes (kB) of memory budget. Several usage models are available for KVM 1010. For example, KVM 1010 may be used on an existing native software stack to give the device the ability to download and run dynamic, interactive, and secure Java content on the device. Alternately, KVM 1010 is used at a lower level to implement the lower level system software and applications of the device in the Java programming language.

MIDP applications, i.e., MIDlet suites, that execute on MID 1008 may be deployed Over the Air (OTA), or conversely, via wired networks to MIDs distributed throughout the network. Mechanisms are provided within the MIDs that allow users to discover MIDlet suites that can be downloaded into the MID. In some cases, discovery of the MIDlet suite is conducted via the MID's resident browser and in other cases, a resident application written specifically to identify MIDlet suites is used.

Figure 11:
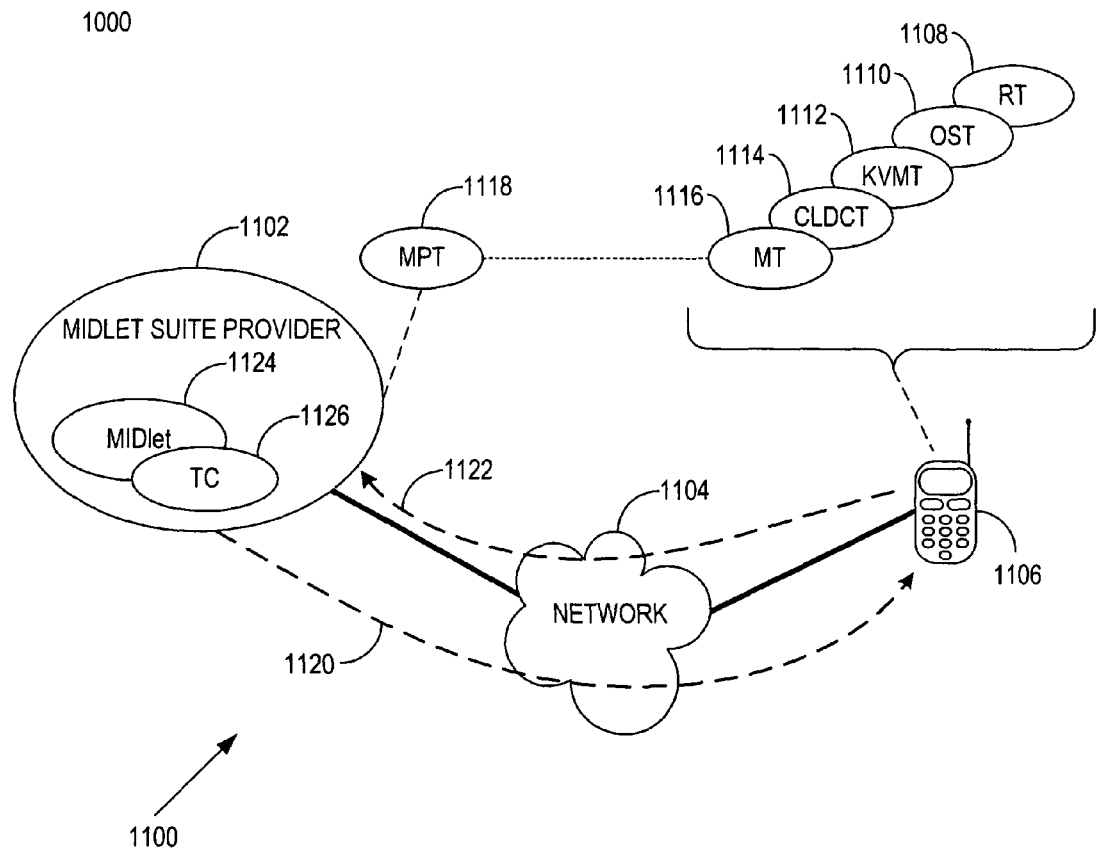
FIG. 11 illustrates a MIDlet suite download scenario and associated trust condition warning system in accordance with the present invention.

MIDlet suite discovery and download scenario 1100 is presented in FIG. 11 that depicts MIDlet suite provider 1102 having MIDlet suite 1124 available for download to MID 1106 via network 1104. MID 1106 is a trusted platform design in accordance with the present invention, in which Root Trust (RT) module 1108 of MID 1106 attests Operating System Trust (OST) 1110 to establish the first trust chain link. OST 1110 attests the KVM Trust (KVMT) 1112, CLDC Trust (CLDCT) 1114 and java profile to set up the next trust chain link and complete the trusted Java running platform at MID 1106.

Transfer of MIDlet suite 1124 and its associated Application Descriptor (AD) file to MID 1106 is conducted via path 1120 using, for example, HyperText Transfer Protocol (HTTP) or a session protocol that implements the HTTP functionality including the header and entity fields. Security challenges may be issued by MIDlet suite provider 1102 using, for example, 401 UNAUTHORIZED or 407 PROXY AUTHENTICATION REQUIRED messages, in response to a MIDlet suite request issued by MID 1106 via path 1122. The challenge response, including username and password credentials, may be transmitted by MID 1106 via path 1122 by re-sending the HTTP request with the credentials supplied in the appropriate header fields. Paths 1120 and 1122 may be implemented using wire, e.g., USB, FireWire, or wireless, e.g., WAP, Bluetooth, IR, communication mediums.

In order to install or update the MIDlet suite onto MID 1106, a Java Archive (JAR) file should be created and transmitted by MIDlet suite provider 1102 to MID 1106. The JAR file contains the class files, a manifest file, and any resource files used by the MIDlet suite. In addition according to the present invention, Trust Condition (TC) file 1126 may be included with the JAR file, so that MID 1106 may extract, verify, and register Midlet suite 1124 with the trusted Java platform trust chain 1108-1114 of MID 1106. The registrations of trust conditions may be understood by referring back to FIG. 5, where trust condition 502, e.g., TC file 1126, is registered with computing platform CAN 504, residing within MID 1106. The trust conditions are then checked against the current configuration of MID 1106 to ultimately complete the trust chain link to MIDlet Trust (MT) 1116 and MIDlet Provider Trust (MPT) 1118, since any difference between the trusted conditions and the current configuration are reported to MIDlet provider 1102. The TC file 1126 may alternately be included with the AD file, which is provided to the Application Management Software (AMS) executing within MID 1106 for AMS verification as to the MIDlet suite's configuration, such as the MIDlet suite's status, settings, changes, operations on it, etc.

TC file 1126 is preferably described by eXtensible Markup Language (XML), and may be protected by any security measures used for XML if the TC file is expressed in XML. The XML trust condition expressions and associated Document Type Definitions (DTD) are exemplified in the following XML code sequence:

```
<?xml version="1.0" encoding="UTF-8"?>
<trustConditions identity='MIDLET-1' idtype='SW-Java-MIDlet'>
    <Restrict>
        <operation>
            <name> copy </name>
            <runner> owner </runner>
        </operation>
        <operation>
            <name> forward </name>
            <runner> owner </runner>
            <method> any </method>
        </operation>
    </Restrict>
    <RunEnvironment>
        <Hardware name="all">
            <Restrict>
                <operation>
                    <name> change </name>
                <operation>
            </Restrict>
        </Hardware>
        <Software name="rest">
            <Restrict>
                <operation>
                    <name> change </name>
                <operation>
            </Restrict>
        </software>
    </RunEnvironment>
</trustConditions>
<?xml version="1.0" encoding="UTF-8"?>
<!-- Trust Condition Definition -->
<!-- Change History -->
<!-- First draft ZhengYan (07.05.2003) -->
<!-- Introduction -->
<!-- This DTD defines trust condition definition for auto
warn distrust event -->
<!ELEMENT trustConditions (Restrict?, RunEnvironment?)>
    <!ATTLIST trustConditions identity CDATA #REQUIRED
                              idtype CDATA #IMPLIED>
<!-- identity is a unique ID used for identifying a platform
component, e.g. HW or SW -->
<!-- ###################################################-->
<!-- # ELEMENT Restrict                              #-->
<!-- ###################################################-->
    <!ELEMENT Restrict (operation*)>
        <!ELEMENT operation (name, time?, runner?, method?)>
            <!ELEMENT name (#PCDATA|copy|forward|change)>
            <!ELEMENT time (#PCDATA)>
            <!ELEMENT runner (#CDATA)>
            <!ELEMENT method (#PCDATA)>
<!-- ###################################################-->
<!-- # ELEMENT RunEnvironment                        #-->
<!-- ###################################################-->
    <!ELEMENT RunEnvironment (Hardware*, Software*)>
        <!ELEMENT Hardware (Restrict)>
            <!ATTLIST Hardware identity CDATA #IMPLIED
                               name CDATA # REQUIRED
                               idtype CDATA #IMPLIED>
        <!ELEMENT software (Restrict)>
            <!ATTLIST Software identity CDATA #IMPLIED
                               name CDATA #REQUIRED
                               idtype CDATA #IMPLIED>
```

The trust conditions specified within TC file 1126 uses identities, which are unique identifications to for identifying a platform component, e.g., hardware or software component. The DTD is included to define a trust condition, such that when the trust condition is not met, an automatic warn distrust event occurs. Element "Restrict" contains restrictions on the operation of the underlying component. Element "RunEnvironment" contains restrictions on the running environment of the underlying identified component.

Figure 12:
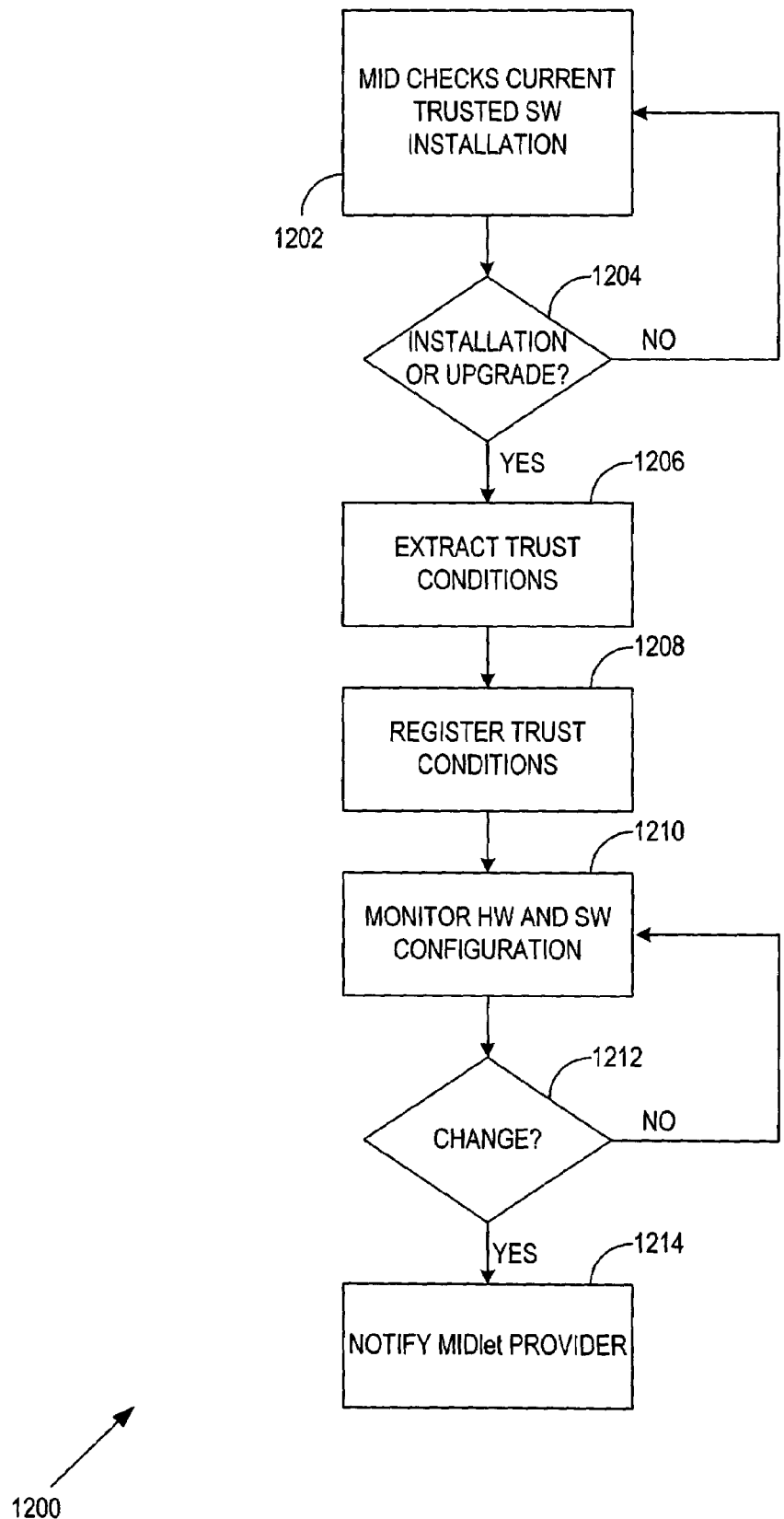
FIG. 12 illustrates an exemplary flow diagram of a MIDlet suite installation/upgrade method to establish conditional trust in accordance with the present invention.

MIDlet installation/upgrade method 1200 is exemplified in the flowchart of FIG. 12 provides an exemplary sequence of steps employed by the present invention to monitor the trust chain established between the MIDs, the MIDlet suites, and their associated suppliers as illustrated in FIG. 11. In step 1202, MID 1106 checks its current trusted configuration state and determines in step 1204 whether a MIDlet installation or upgrade has commenced. If so, then TC 1126 is extracted from MIDlet suite 1124 in step 1206 and registered with computing platform CAN, e.g., 504, residing within MID 1106 as in step 1208. The computing platform CAN monitors the HW and SW operation at the underlying MID platform in step 1210 and checks it against the trust conditions extracted in step 1206. If a change is detected 1212, MIDlet provider 1102 is notified 1214 via path 1122 according to a provider preferred method. A change may be detected, for example, if after the installation or upgrade of the MIDlet suite, the user of MID 1106 modifies the MIDlet suite for his own purposes, such that the restrictions imposed upon the MIDlet suite by elements "Restrict" in TC file 1126, for example, are violated.

It can be seen, therefore, that the trust chain between MID 1106, e.g., 1108-1116, and MIDlet provider 1102, e.g., 1118, can be extended through use of the present invention. If, for example, the user of MID 1106 modifies the newly installed MIDlet suite, then through operation of the computing platform CAN 504, the change is detected and signalled back to the MIDlet provider via the auto warn method exemplified in FIG. 12. In this way, even if the user modifies the MIDlet suite using the provider's correct data for subsequent attestation, the change may be detected and reported back to the MIDlet supplier so that the MIDlet supplier may take the appropriate action.

The above example may be extended to any content provider and its associated content. That is to say that content providers offering any form of software/digital data such as images, video streams, executables, source code, ring tones, games, etc., that may be provided to any other consumption device may establish conditional trust between the consumption device and the provided content. A trust condition file may be generated by the content provider and provided to a computing platform CAN within the consumption device, such that distrust signals may be generated by the consumption device under distrust conditions. In other words, whenever the consumption device detects, for example, any one of a software status change, a hardware status change, a software setting change, a hardware setting change, a software change, a hardware change, a hardware operation change, an Input/Output (I/O) change, and/or a software operation change with respect to the trusted condition file, the consumption device provides a distrust signal to the content provider, so that the content provider may take the appropriate action.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method, comprising:
   receiving, at a trustee via a computer network, metrics generated by a trustor that represent a pre-defined trust condition between the trustor and the trustee;
   establishing a trust relationship between the trustee and the trustor via the computer network based on the pre-defined trust condition;
   while the trust relationship is in force in a currently running state of the trustee and the trustor, comparing the generated metrics to current metrics of the trustee in response to an event detected internally within the trustee that changes the pre-defined trust condition; and
   issuing a distrust signal via the computer network by the trustee in response to a mismatch between the generated metrics of the trustor and the current metrics of the trustee, wherein the distrust signal indicates to the trustor that the trust relationship is no longer valid.

2. The method according to claim 1, wherein comparing the generated metrics to the current metrics occurs in response to an influence.

3. The method according to claim 2, wherein the influence includes at least one of a software or hardware component change within the trustee.

4. The method according to claim 2, wherein the influence includes a hardware status change within the trustee.

5. The method according to claim 1, wherein comparing the generated metrics to the current metrics occurs at regular time intervals.

6. The method according to claim 1, wherein issuing the distrust signal uses a wireless mechanism for distrust signal delivery.

7. The method according to claim 1, wherein issuing the distrust signal uses a wired mechanism for distrust signal delivery.

8. The method according to claim 6, wherein the wireless mechanism includes one of a Multimedia Messaging Service (MMS) or a Short Message Service (SMS) message.

9. The method according to claim 1, further comprising initially establishing a trust attestation.

10. A trusted computing system, comprising:
    a trustor terminal coupled to provide a trust condition via a network to define a configuration state; and
    a trustee terminal coupled to receive the trust condition via the network and coupled to provide attestation of the configuration state to the trustor terminal in order to establish a trust relationship with the trustor terminal, wherein the trustee terminal, while the trust relationship is in force in a currently running state of the trustee terminal and the trustor terminal, detects a current configuration state in response to an event detected internally within the trustee terminal that changes the trust condition and provides a distrust signal via the network when the current configuration state does not match the trusted condition, wherein the distrust signal indicates to the trustor that the trust relationship is no longer valid.

11. The trusted computing system according to claim 10, wherein the trustee terminal comprises:
    a computing platform coupled to receive the trust condition; and
    a current integrity metric generator coupled to receive configuration inputs and coupled to provide the configuration state.

12. The trusted computing system according to claim 11, wherein the configuration inputs comprise one of a software configuration update, a hardware operation, a software operation, or a hardware status operation.

13. The trusted computing system according to claim 10, wherein the distrust signal is provided via a wireless connection.

14. The trusted computing system according to claim 10, wherein the distrust signal is provided via a wire connection.

15. The trusted computing system according to claim 13, wherein the wireless connection includes one of a Multimedia Messaging Service (MMS), a Short Message Service (SMS), Bluetooth, or Infrared (IR) connection.

16. The trusted computing system according to claim 10, wherein the trustee terminal includes one of a mobile terminal, laptop computer, personal computer, or server.

17. The trusted computing system according to claim 10, wherein the trustor terminal includes one of a mobile terminal, laptop computer, personal computer, or server.

18. An apparatus comprising:
an interface capable of being coupled to a computing platform configured that receives trust conditions via a network from a trustor that defines a trusted configuration state, wherein the trust conditions are used for establishing a trust relationship between the trustor and a trustee platform via the network; and
an information monitor coupled to the interface and configured to monitor configuration and status signals internally generated within the trustee platform that indicate changes the trust condition and, while the trust relationship is in force in a currently running state of the trustee platform and the trustor, to report a configuration state of the trustee platform via the network to the computing platform, wherein the computing platform generates a distrust signal when the configuration state of the trustee platform does not match the trusted configuration state, wherein the distrust signal indicates that the trust relationship is no longer valid.

19. The apparatus according to claim 18, wherein the apparatus is integrated into a single processor.

20. The apparatus according to claim 18, wherein the apparatus is distributed between at least two processors.

21. A method comprising:
receiving, via a computer network, metrics generated by a trustor that represents a trusted condition between the trustor and a trustee;
establishing a conditional trust reference at the trustee via the computer network in response to receiving the metrics generated by the trustor;
generating metrics by the trustee according to the conditional trust reference at a trust attestation stage;
registering the conditional trust reference at a trusted computing platform within the trustee;
establishing a trust relationship between the trustee and the trustor via the computer network based on the conditional trust reference;
while the trust relationship is in force in a currently running state of the trustee and the trustor, checking, in response to an event detected internally within the trustee, the trustee generated metrics against current metrics of the trustee according to the conditional trust reference; and
issuing a distrust signal via the computer network by the trustee in response to a mismatch between the conditional trust reference and the current metrics of the trustee, wherein the distrust signal indicates to the trustor that the trust relationship is no longer valid.

22. The method according to claim 21, further comprising registering the trustee generated metrics according to the conditional trust reference.

23. An apparatus comprising:
a processor configured with instructions that cause the apparatus to:
receive, at the apparatus via a network, metrics generated by a trustor that represent a pre-defined trust condition between the trustor and the apparatus;
establish a trust relationship via the network between the apparatus and the trustor based on the pre-defined trust condition;
while the trust relationship is in force in a currently running state of the apparatus and the trustor, compare the generated metrics to current metrics of the apparatus in response to an event detected internally within the trustee that changes the pre-defined trust condition; and
issue a distrust signal via the network by the apparatus in response to a mismatch between the generated metrics of the trustor and the current metrics of the apparatus, wherein the distrust signal indicates to the trustor that the trust relationship is no longer valid.

24. The apparatus according to claim 23, wherein comparing the generated metrics to the current metrics occurs in response to an influence occurring at the apparatus.

25. The apparatus according to claim 23, wherein comparing the generated metrics to the current metrics occurs at regular time intervals.

26. The apparatus according to claim 23, wherein the apparatus comprises a mobile terminal.

27. A computer-readable storage medium having instructions stored thereon which are executable by an apparatus for performing:
receiving, at the apparatus via a network, metrics generated by a trustor that represent a pre-defined trust condition between the trustor and the apparatus;
establishing a trust relationship via the network between the apparatus and the trustor based on the pre-defined trust condition;
while the trust relationship is in force in a currently running state of the apparatus and the trustor, comparing the generated metrics to current metrics of the apparatus in response to an event detected internally within the trustee that changes the pre-defined trust condition; and
issuing a distrust signal via the network by the apparatus in response to a mismatch between the generated metrics of the trustor and the current metrics of the apparatus, wherein the distrust signal indicates to the trustor that the trust relationship is no longer valid.

28. The computer-readable storage medium according to claim 27, wherein comparing the generated metrics to the current metrics occurs in response to an influence occurring at the apparatus.

29. The computer-readable storage medium according to claim 27, wherein comparing the generated metrics to the current metrics occurs at regular time intervals.

* * * * *